US012599210B1

(12) United States Patent
Wang

(10) Patent No.: US 12,599,210 B1
(45) Date of Patent: Apr. 14, 2026

(54) PORTABLE HEATED LUNCH BOX

(71) Applicant: Xinxing Wang, Shenzhen (CN)

(72) Inventor: Xinxing Wang, Shenzhen (CN)

( * ) Notice: Subject to any disclaimer, the term of this patent is extended or adjusted under 35 U.S.C. 154(b) by 0 days.

(21) Appl. No.: 19/378,448

(22) Filed: Nov. 4, 2025

(51) Int. Cl.
 *A45C 11/20* (2006.01)
 *A47J 41/00* (2006.01)
(52) U.S. Cl.
 CPC ............. *A45C 11/20* (2013.01); *A47J 41/005* (2013.01)
(58) Field of Classification Search
 CPC .......... A45C 11/20; A47J 41/005; A47J 39/02
 USPC ......................................................... 206/541
 See application file for complete search history.

(56) References Cited

U.S. PATENT DOCUMENTS

| | | | | |
|---|---|---|---|---|
| 2,976,390 | A | * | 3/1961 | Stemp ...................... A47J 47/14 |
| | | | | 220/756 |
| 3,619,563 | A | * | 11/1971 | Hirst ................... A47J 36/2483 |
| | | | | 219/202 |
| 4,206,343 | A | * | 6/1980 | Mousel ................... A47J 47/14 |
| | | | | 126/261 |
| 9,669,986 | B1 | * | 6/2017 | Evans .................... A45C 11/20 |

| | | | | |
|---|---|---|---|---|
| 11,906,210 | B1 | * | 2/2024 | Wang ...................... A45C 11/20 |
| 12,408,781 | B1 | * | 9/2025 | Wang ................... B65D 51/247 |
| 12,502,026 | B1 | * | 12/2025 | Ou ....................... A47J 36/2483 |
| 2014/0175130 | A1 | * | 6/2014 | Wheeless ............... A45C 11/20 |
| | | | | 222/333 |
| 2025/0380837 | A1 | * | 12/2025 | Lettner ................... A47J 39/02 |

* cited by examiner

*Primary Examiner* — Jacob K Ackun
(74) *Attorney, Agent, or Firm* — Birchwood IP

(57) ABSTRACT

A portable heated lunch box comprises a housing, an intermediate housing, a liner, a battery, a heating tube, a heat-conducting plate, a temperature sensing module and a control module. The intermediate housing is sleeved inside the housing, and the liner is sleeved inside the intermediate housing; the battery, the heating tube and the heat-conducting plate are arranged between the bottoms of the housing and the intermediate housing, the heat-conducting plate fits with the bottom of the intermediate housing, the heating tube comes in contact with the heat-conducting plate for heat conduction, and the battery, the heating tube and the temperature sensing module are electrically connected to the control module. The internal components are compactly arranged, and external power supply is not required for heating. The temperature sensing module is close to the heating area. A display module ensures intuitive monitoring of heating temperature, remaining battery level and heating duration.

10 Claims, 2 Drawing Sheets

32
310
31
3
2
21
6
7
5
51
510
4
8
9
41
410
1

PORTABLE HEATED LUNCH BOX

CROSS-REFERENCE TO RELATED APPLICATIONS

This application claims priority to Chinese Patent Application No. 202522155074.9, filed on Oct. 13, 2025, which is hereby incorporated by reference in its entirety.

TECHNICAL FIELD

The invention relates to the technical field of daily necessities, specifically belongs to the category of food heating and insulated containers, and particularly to a portable heated lunch box.

BACKGROUND

With the accelerating rhythm of life and the increase in outdoor and travel activities, users' demand for portability and flexibility in food heating is growing. Heated lunch boxes have gradually become essential tools for daily use. However, there are numerous shortcomings to be solved urgently in the prior art. Firstly, traditional heated lunch boxes mostly rely on mains supply or vehicle power supply and require connection to an external power supply via a power cord. They cannot be used independently without a fixed power supply, so that they are difficult to adapt to scenarios such as outdoor environments or office areas without sockets. As a result, they fail to meet users' core need for heating food anytime and anywhere, significantly lacking in portability. Secondly, some heated lunch boxes lack precise temperature sensing and control mechanisms and rely only on simple on-off circuits for heating. This can easily lead to food overheating, causing nutrient loss and degraded taste, or insufficient heating, causing food to fail to reach a suitable eating temperature. They are unable to adapt to the heating requirements of different types of food, such as rice, soups or dishes, and have low temperature control accuracy. Additionally, most heated lunch boxes have no temperature display function, so that users cannot intuitively understand the current heating status.

SUMMARY

To solve the abovementioned problems, the invention proposes a portable heated lunch box, comprising a housing, an intermediate housing and a liner, and further comprising a battery, a heating tube, a heat-conducting plate, a temperature sensing module and a control module; the intermediate housing is sleeved inside the housing, and the liner is sleeved inside the intermediate housing; the battery, the heating tube and the heat-conducting plate are arranged between the bottom of the housing and the bottom of the intermediate housing, the heat-conducting plate fits with the bottom of the intermediate housing, the heating tube comes in contact with the heat-conducting plate for heat conduction, and the battery, the heating tube and the temperature sensing module are electrically connected to the control module.

Further, the portable heated lunch box further comprises a heating tube bracket, wherein the heating tube is arranged on the heating tube bracket.

Further, supporting legs are arranged at the outer bottom of the intermediate housing and support the inner bottom of the housing to create an accommodating space between the inner bottom of the housing and outer bottom of the intermediate housing for accommodating the battery and the heating tube bracket.

Further, the heating tube bracket is provided with a plurality of hollow fixing feet, and the supporting legs of the intermediate housing are inserted into the hollow fixing feet and fixed to the inner bottom of the housing.

Further, the portable heated lunch box further comprises a battery rack, wherein the battery is arranged inside the battery rack, and the battery rack is arranged inside the accommodating space and located at the inner bottom of the housing.

Further, the battery rack further comprises a fixing foot position, the hollow fixing feet of the heating tube bracket corresponds to the fixing foot position, and the fixing foot position corresponds to a mounting foot seat fixed at the bottom of the housing.

Further, the temperature sensing module is arranged on the heating tube bracket.

Further, a bracket rubber ring is further arranged on the periphery of the heating tube bracket.

Further, the portable heated lunch box further comprises a display module, which is electrically connected to the control module.

Further, the portable heated lunch box further comprises a wireless transmission module, which is electrically connected to the control module.

Therefore, the invention has the following beneficial effects: by optimizing the structural design and functional integration, the shortcomings of the existing heated lunch boxes can be effectively addressed. Firstly, by incorporating the battery and heating tube within the accommodating space between the housing and the intermediate housing, the internal components are compactly arranged without increasing the overall volume of the lunch box, thereby meeting the core need for heating without external power in various scenarios, significantly enhancing the portability and adaptability of the lunch box to different environments. Secondly, the temperature sensing module is arranged on the heating tube bracket, so that the temperature sensing module is close to the heating area, can collect the temperature of the heating area in real time and transmit it to the control module to achieve precise temperature control. By integrating the display module electrically connected to the control module, users can intuitively view information such as current heating temperature, remaining battery level and heating duration, eliminating the need for blindly judging the heating status.

Figure 1:
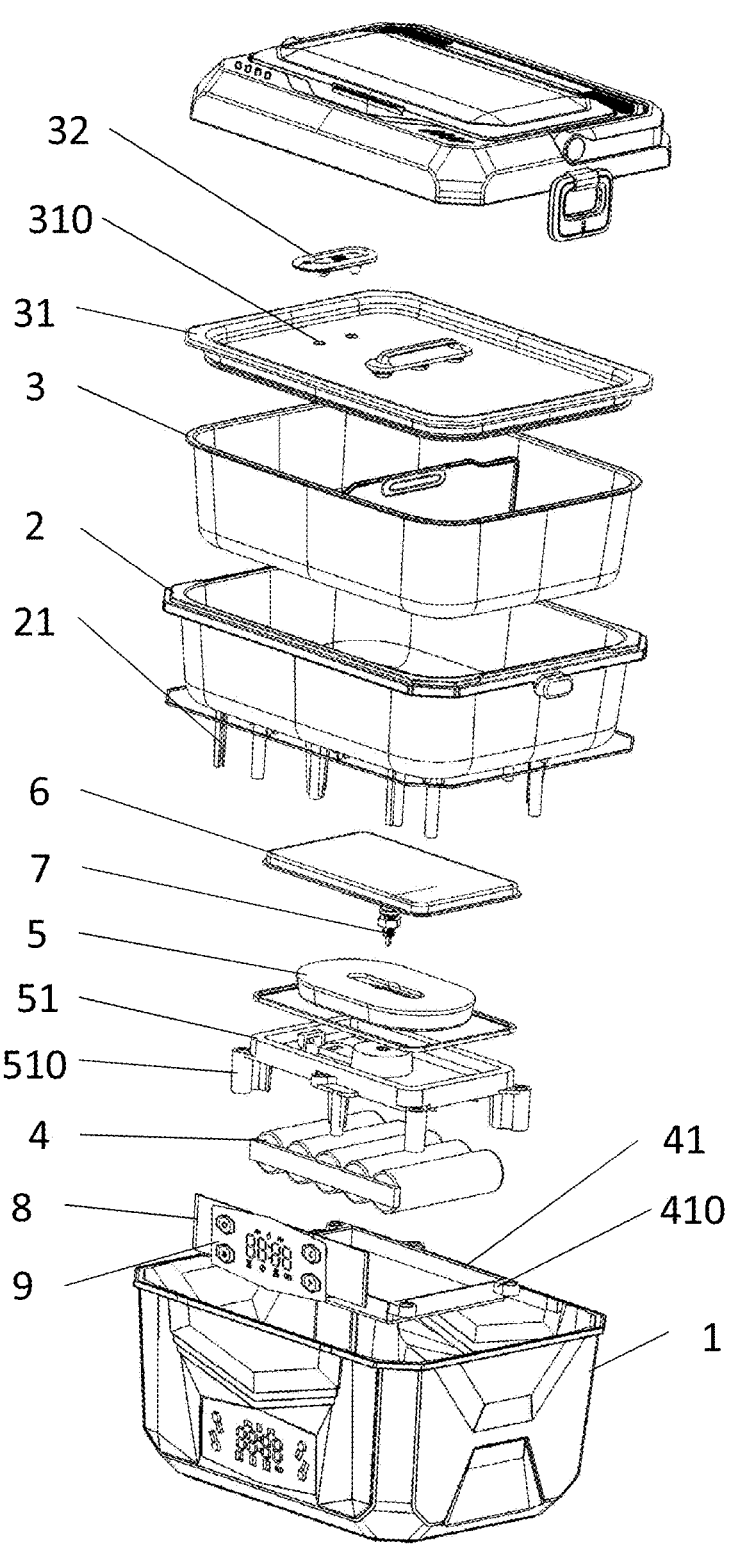
FIG. 1 is an exploded view of the structure of the portable heated lunch box in the invention.

Reference signs: 1. Housing; 11. Mounting foot seat; 2. Intermediate housing; 21. Supporting leg; 3. Liner; 31. Upper cover plate; 310. Vent hole; 32. Silicone vent hole component; 4. Battery; 41. Battery rack; 410. Fixing foot position; 5. Heating tube; 51. Heating tube bracket; 510. Hollow fixing foot; 6. Heat-conducting plate; 7. Temperature sensing module; 8. Control module; 9. Display module.

DESCRIPTION OF EMBODIMENTS

In the description of the invention, it should be understood that terms indicating orientation or positional relationships, such as "center", "longitudinal", "transverse", "length", "width", "thickness", "upper", "lower", "front", "rear", "left", "right", "vertical", "horizontal", "top", "bottom", "inner", "outer", "clockwise" and "counterclockwise", are based on the orientation or positional relationships shown in the drawings. These terms are used merely for the convenience of describing the invention and simplifying the description, and do not indicate or imply that the referred device or component must have a specific orientation or be constructed and operated in a specific orientation. Therefore, they should not be construed as limiting the invention.

In the description of the invention, the term "a plurality of" means two or more, unless otherwise explicitly defined.

In the description of the invention, it should be noted that unless otherwise expressly specified and defined, the terms such as "installed", "provided with", "sleeved", "connected" should be interpreted in a broad sense. For example, "connected" may be fixedly, detachably or integrally connected; "connected" may be mechanically or electrically connected; "connected" may be directly connected, or indirectly connected through an intermediate medium, or connected between two elements. Those skilled in the art can understand the specific meanings of these terms in the context of the invention as the case may be.

Figure 2:
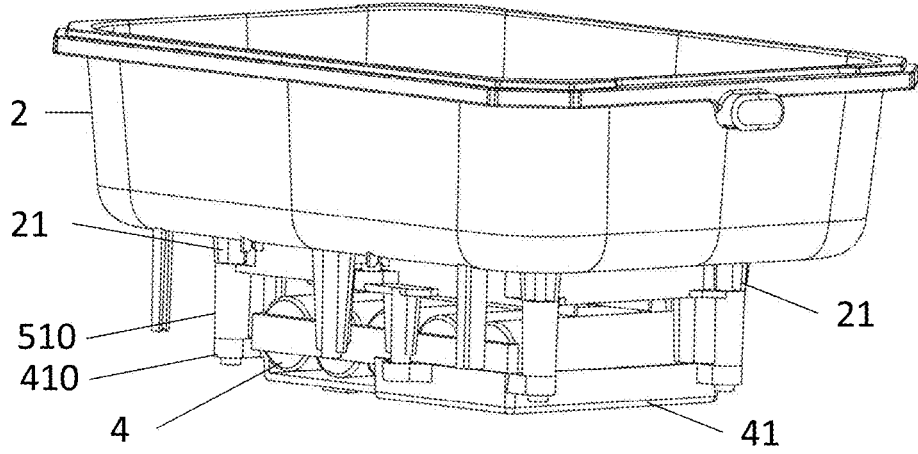
FIG. 2 is a schematic diagram of the combined state of the intermediate housing, the heating tube bracket and the battery rack.
Figure 3:
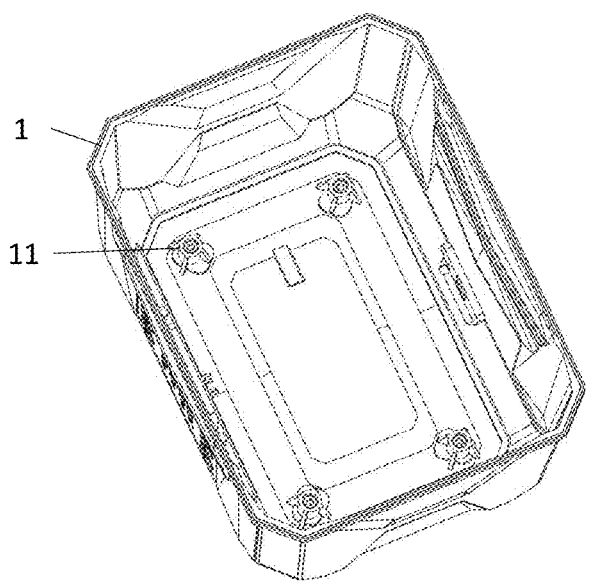
FIG. 3 is a schematic diagram of the bottom structure inside the housing.

As shown in FIG. 1 to FIG. 3, a portable heated lunch box proposed by the invention comprises a housing 1, an intermediate housing 2 and a liner 3, which adopt a nested assembly design. The intermediate housing 2 is appropriately arranged in the internal space of the housing 1, and the liner 3 is correspondingly sleeved in the internal space of the intermediate housing 2. The three-layer nested structure achieves the basic accommodation and protection functions of the lunch box. A battery 4, a heating tube 5, a heat-conducting plate 6, a temperature sensing module 7 and a control module 8 are assembled between the bottom area inside the housing 1 and the bottom of the intermediate housing 2. The components are distributed in this area according to functional requirements: one side of the heat-conducting plate 6 closely fits with the bottom of the intermediate housing 2 to ensure efficient heat transfer to the intermediate housing 2 and the liner 3; the heating tube 5 is in direct contact with the other side of the heat-conducting plate 6, and heat is conducted to the heat-conducting plate 6 through contact heat conduction; meanwhile, the battery 4, the heating tube 5 and the temperature sensing module 7 are electrically connected to the control module 8, which realizes the heating control of the heating tube 5 and the processing of the temperature information collected by the temperature sensing module 7, thereby ensuring the stability and safety of the lunch box during the heating process.

Further, to ensure the stable installation of the heating tube 5, the structure also comprises a heating tube bracket 51. The heating tube 5 is fixedly arranged on the heating tube bracket 51, and the heating tube bracket 51 provides support and positioning for the heating tube 5, preventing displacement or shaking of the heating tube during use. Supporting legs 21 are integrally formed or fixedly connected at the bottom on the outside of the intermediate housing 2, the lower ends of the supporting legs 21 are supported by the mounting feet seat 11 at the bottom inside the housing 1. Through the supporting effect of the supporting legs 21, an accommodating space is formed between the inner bottom of the housing 1 and the outer bottom of the intermediate housing 2. The battery 4 and the heating tube bracket 51 equipped with the heating tube 5 are both contained in the accommodating space, which not only provides a mounting carrier for each electrical component but also offers certain protection to the components.

To enhance the assembly stability among the intermediate housing 2, the heating tube bracket 51 and the housing 1, a plurality of hollow fixing feet 510 are arranged on the heating tube bracket 51. The supporting legs 21 at the bottom of the intermediate housing 2 can be correspondingly inserted into the internal channels of the hollow fixing feet 510. Moreover, after passing through the hollow fixing feet 510, the lower ends of the supporting legs 21 are directly arranged on the mounting foot seat 11 inside the housing 1 and then locked by a locking piece (not shown in the drawing) from the bottom outside the housing 1. Through the supporting legs 21, the hollow fixing feet 510, the mounting feet seat 11 at the bottom of the housing 1 and the locking piece, the intermediate housing 2, the heating tube bracket 5 and the housing 1 are fixed.

Furthermore, to enhance the mounting stability of the battery 4, a battery rack 41 can also be equipped. The battery 4 is appropriately installed inside the battery rack 41, which is integrally arranged in the accommodating space and located at the bottom inside the housing 1. The battery rack 41 is used to limit and fix the battery 4 to prevent the battery 4 from colliding or shifting during carrying or use. Fixing foot positions 410 corresponding to the number and position of the hollow fixing foot 510 of the heating tube bracket 5 are arranged on the battery rack 41. During assembly, the hollow fixing foot 510 of the heating tube bracket 5 corresponds to the fixing foot positions 410 of the battery rack 41, and the lower ends of the fixing foot positions 410 of the battery rack 41 are correspondingly arranged on the mounting foot seat 11 at the bottom of the housing 1. Moreover, the intermediate housing 2, the heating tube bracket 51, the battery rack 41 and the housing are fixed together through locking pieces, further enhancing the assembly firmness among the components and ensuring the stability of the overall structure during use.

The temperature sensing module 7 is correspondingly arranged on the heating tube bracket 51 and can directly collect the temperature information around the heating tube 5 and transmit the temperature signal in real time to the control module 8, so that the control module 8 can adjust the operating state of the heating tube in a timely manner according to the temperature conditions, achieving precise temperature control.

A heat-conducting plate 6 is installed on the outer side of the bottom of the intermediate housing 2. The heat-conducting plate 6 is made of metal with good heat conduction performance. Meanwhile, the lower surface of the heat-conducting plate 6 is closely attached to the upper surface of the heating tube 5, forming a gapless heat conduction contact and providing a stable path for heat transfer. The liner is nested inside the intermediate housing 2. The liner 3 and the intermediate housing 2 are nested in a detachable way, facilitating users to take out the liner 3 for food storage and cleaning; an upper cover plate 31 is arranged on the top of the liner 3. The opening between the upper cover plate 31 and the liner 3 is sealed by a seal ring. A vent hole 310 is provided at the predetermined position of the upper cover plate 31 and equipped with a silicone vent hole component 32, which remains closed under normal conditions to prevent the food and soup inside the liner from overflowing. During the heating process, steam is generated inside the liner 3. The user can open the silicone vent hole component 32 to relieve the pressure and then open the upper cover plate 31.

The control module 8 can be integrated into the side wall or top area inside the housing 1. The control module 8 can be electrically connected to the battery 4 and the heating tube 5. Moreover, the control module 8 can also be electrically connected to the temperature sensing module 7, the display module 9 and the wireless transmission module (not shown in the drawing). The temperature sensing module 7 is fixedly installed on the top of the heating tube bracket 51, and the sensing end thereof faces the contact area of the heat-conducting plate 6 to collect the temperature data of this area in real time and transmit the data to the control module 8 in real time. The display module 9 can be a liquid crystal display or LED display panel, which is embedded on the outer surface of the housing for users to observe and used to receive and present information such as heating temperature, remaining power and heating duration transmitted by the control module 8 in a visual form; the wireless transmission module can be Bluetooth, which is integrated inside or adjacent to the control module to achieve wireless communication connection between the control module and external terminals.

In actual use, the user first puts the food to be heated into the liner 3 and then covers the upper cover plate 31 of the liner 3 to ensure good seal between the upper cover plate 31 and the liner 3. Subsequently, the heating function is activated through the control button on the surface of the housing 1 or an external terminal. After receiving the start instruction, the control module 8 sends a power supply signal to the battery 4. The battery 4 supplies power to the heating tube 5. Once energized, the heating tube 5 is generates heat, which is transferred to the bottom of the intermediate housing 2 through the heat-conducting plate 6 in close contact with the heating tube 5 and then conducted to the liner 3 by the intermediate housing 2 to heat the food. During the heating process, the temperature sensing module 7 continuously collects the temperature data of the heating area and feeds it back to the control module 8. When the temperature reaches the preset edible temperature range, the control module 8 automatically cuts off the power supply circuit of the heating tube and stops heating. If the temperature drops below the preset insulation temperature, the control module 8 will restart the power supply of the heating tube 5 to maintain the stable food temperature. During this process, users can view the current heating temperature and remaining battery level in real time through the display module 9, and can also remotely adjust the heating temperature or turn off the heating function in advance via an external terminal. The steam generated during heating is discharged through the vent hole and the silicone component for the cover plate on the liner, avoiding excessive pressure inside the liner. Even during outdoor movement or travel, the internal structure of the entire lunch box remains stable, as the battery 4, the heating tube 5 and other components are secured with dedicated brackets, and the intermediate housing 2 and the heating tube bracket 51 are positioned via the fit between the supporting legs 21 and the hollow fixing feet 510, ensuring that no component shifts or malfunctions due to vibration.

The basic principles, main features and advantages of the invention have been demonstrated and described above. Those skilled in the art should understand that the invention is not limited by the embodiments described above. The above-mentioned embodiments and the description in the specification are merely preferred embodiments of the invention and are not intended to restrict the invention. Without departing from the spirit and scope of the invention, various changes and improvements may be made, all of which fall within the scope of protection of the invention. The scope of protection of the invention is defined by the appended claims and their equivalents.

What is claimed is:

1. A portable heated lunch box, comprising a housing, an intermediate housing and a liner, and further comprising a battery, a heating tube, a heat-conducting plate, a temperature sensing module and a control module; the intermediate housing is sleeved inside the housing, and the liner is sleeved inside the intermediate housing;

the battery, the heating tube and the heat-conducting plate are arranged between the bottom of the housing and the bottom of the intermediate housing, the heat-conducting plate fits with the bottom of the intermediate housing, the heating tube comes in contact with the heat-conducting plate for heat conduction, and the battery, the heating tube and the temperature sensing module are electrically connected to the control module.

2. The portable heated lunch box according to claim 1, further comprising a heating tube bracket, wherein the heating tube is arranged on the heating tube bracket.

3. The portable heated lunch box according to claim 2, wherein supporting legs are arranged at the outer bottom of the intermediate housing and support the inner bottom of the housing to create an accommodating space between the inner bottom of the housing and outer bottom of the intermediate housing for accommodating the battery and the heating tube bracket.

4. The portable heated lunch box according to claim 3, wherein the heating tube bracket is provided with a plurality of hollow fixing feet, and the supporting legs of the intermediate housing are inserted into the hollow fixing feet and fixed to the inner bottom of the housing.

5. The portable heated lunch box according to claim 4, further comprising a battery rack, wherein the battery is arranged inside the battery rack, and the battery rack is arranged inside the accommodating space and located at the inner bottom of the housing.

6. The portable heated lunch box according to claim 5, wherein the battery rack further comprises a fixing foot position, the hollow fixing feet of the heating tube bracket corresponds to the fixing foot position, and the fixing foot position corresponds to a mounting foot seat fixed at the bottom of the housing.

7. The portable heated lunch box according to claim 2, wherein the temperature sensing module is arranged on the heating tube bracket.

8. The portable heated lunch box according to claim 2, wherein a bracket rubber ring is further arranged on the periphery of the heating tube bracket.

9. The portable heated lunch box according to claim 1, further comprising a display module, which is electrically connected to the control module.

10. The portable heated lunch box according to claim 1, further comprising a wireless transmission module, which is electrically connected to the control module.

* * * * *